Feb. 17, 1942.  J. BIJUR  2,273,013
LUBRICATION
Filed June 1, 1936
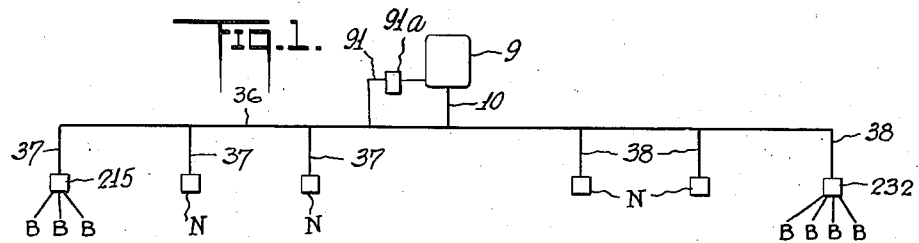
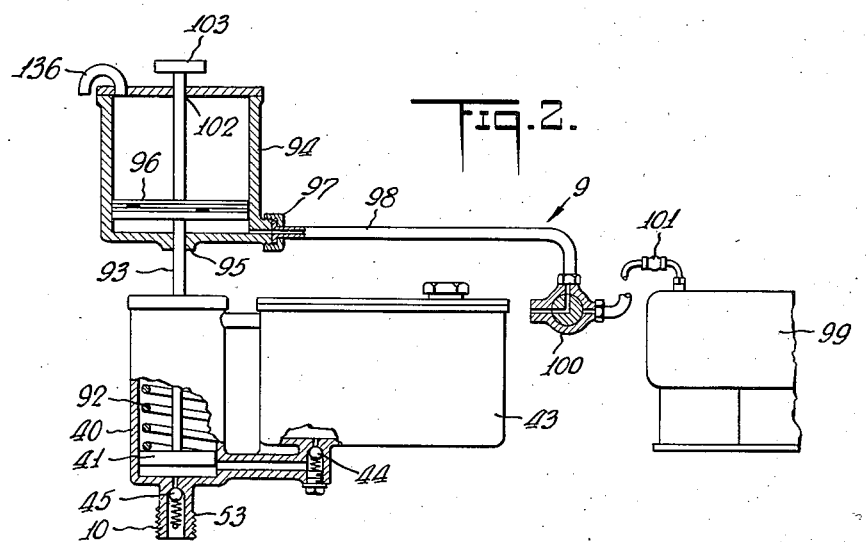
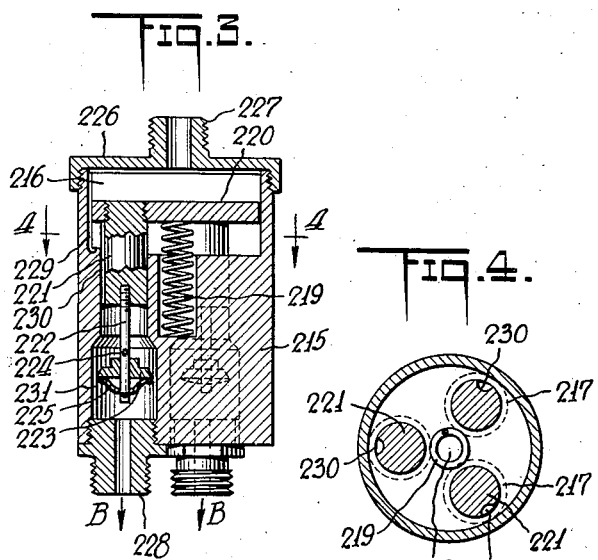
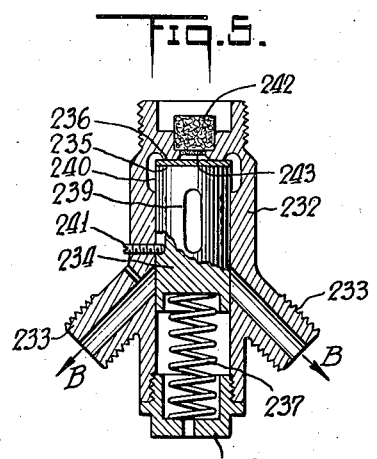
INVENTOR
Joseph Bijur, Deceased
by George Bijur, Executor
BY
ATTORNEYS Patented Feb. 17, 1942

2,273,013

UNITED STATES PATENT OFFICE 2,273,013

LUBRICATION

Joseph Bijur, deceased, late of New York, N. Y., by George Bijur, executor, New York, N. Y., assignor to Auto Research Corporation, a corporation of Delaware Application June 1, 1936, Serial No. 82,750

7 Claims. (Cl. 184—7)

The present invention relates to remote control lubrication and is concerned primarily with systems and installations, and the constituent elements thereof, for lubricating one or more bearings on a machine or group of machines from a readily accessible point or points of control. The invention has its preferred application to the lubrication of all or most of the bearings on the chassis of a vehicle, such as an automobile or motor truck.

An object is to provide a reliable lubricating installation, more particularly for motor vehicles, the use of which shall not require the exercise of any selective discretion, but in which following the simplest of manipulations, predetermined charges of lubricant may be distributed at a plurality of bearings, whether tight or loose, without overflow.

Another object is to provide apparatus of the above type, the constituent parts of which shall be simple and durable in construction, easy to install, and unlikely to become out of order even after prolonged use.

The invention is primarily concerned with pressure lubricating systems, that is, with systems in which desired charges of oil are forced under pressure into the bearings.

It may be noted that where in a system of this type, oil is forced from a pump past a plurality of relief valves in parallel to corresponding bearings, unless the resistance to pressure of each line from the pump to a bearing, including the resistances of said bearing and of the relief valve in the line, is substantially uniform, lubricant is likely to be forced, first through the line of least resistance so that pressure is relieved therethrough, and disproportionate charges of oil from the pump cylinder may be supplied to different bearings, some overflowing and others receiving too little oil.

By this invention, there is provided an arrangement for overcoming this objection. In one embodiment of the invention, a lubricant measuring valve is associated preferably with each bearing, to assure a supply thereto, upon operation, of the predetermined measured quantity of lubricant. The measuring elements may be in the form of automatic pressure-operated measuring valves.

To assure the regular functioning of the lubricant measuring elements, it is preferred to maintain the lubricant lines from the pump to the bearings filled with oil at all times. This result is accomplished by the use of pressure-operated check valves, which may be associated in a unitary structure, with the measuring valves, particularly where the latter are adjacent or at the bearings. To assure effective seating of the check valves, it is preferred to employ means for eliminating solid particles of dirt and chips from the lubricant before the latter reaches the relief valves, whereby the oil is freed of solid particles in its flow from the source of pressure to the plunger, but is propelled at sufficient speed to operate the measuring valve.

In the accompanying drawings in which are shown some of various possible embodiments of the several features of the invention, Fig. 1 is a diagrammatic view of one form of centralized installation, Fig. 2 is a detail view, partly broken away, of the pump and reservoir installation employed in Fig. 1, Fig. 3 is a view in longitudinal cross-section of one form of a measuring valve, Fig. 4 is a transverse sectional view taken along the line 4—4 of Fig. 3, and Fig. 5 shows a longitudinal sectional view of an alternative form of valve which may be employed.

In Fig. 1 is shown a diagrammatic view of a centralized system for a machine or chassis lubricated by the hand or automatically operated pump 9, shown in Fig. 2. The outlet 10 of the pump 9 is connected to a single pipe or header 36 extending across the chassis which, in turn, feeds pipes 37 and 38 on various parts of the machine.

Measuring valve appliances 215 and 232, such as shown in Figs. 3 to 5 are supplied from these pipes, to lubricate bearings on the machine, the piping being preferably solid metal tubing constructed and arranged as shown in detail in Patent No. 1,632,772 granted on the 14th day of July 1927.

The pump illustratively shown in Fig. 2 comprises a cylinder 40 within which is a piston 41 maintained normally in pump-discharging position by the expansion of a coil spring 92. The cylinder is connected to or cast integral with a pump reservoir 43 communicating at the bottom through a check valve 44 of any appropriate construction, and the usual outlet check valve 45 is provided near the outlet of the pump.

If oil carrying solid particles were supplied to the bearings, the check valves to be hereinafter described, by which the lines are maintained full, might be rendered inoperative by lodging a particle of dirt which may prevent complete seating of the valve.

This difficulty is remedied by the provision of appropriate filtering means (not shown) adjacent the pump to intercept solid particles. Since, as heretofore noted, it is desired in the present system to cause the oil to enter the bearings under pressure, it is preferred to employ a filter of relatively low resistance, so that with the application of moderate pressures at the pump, there will be ample pressure at the bearing after the drop of pressure potential in the filter and in the length of the line.

The pump of Fig. 2 may be charged by engine compression to store energy in spring 92, the expansion of which effects the discharge. The prolongation of the piston stem 93 extends into a cylinder 94 through a stuffing box 95 and carries a piston head 96 movable in said cylinder. The lower end of the upper or charging cylinder is provided with a boss 97 to which is attached a pipe 98 connected at its opposite end to the top of one of the gas engine cylinders 99.

A two-way valve 100 normally connects the charging cylinder with atmosphere, as shown, and may be turned by hand or automatically at desired intervals to connect said charging cylinder with the engine cylinder.

The check valve 101 in the line adjacent the engine cylinder allows the passage of compressed gas from the engine to the charging cylinder, while preventing reverse flow from the charging cylinder during the suction stroke of the engine cylinder.

The piston stem 93 continues up through an aperture 102 in the cover of the charging cylinder and its end is provided with a handle 103 by which the pump may be manually charged, if desired, or required.

In the chassis of Fig. 1 there are shown other measuring appliances N which may be of other types as shown in said Patent 1,632,772 and disposed in the run of the line near the bearings, or directly connected to the bearings.

In Figs. 3 and 4 is shown a measuring device for forcing measured quantities of oil to three outlets simultaneously.

This device consists of a fitting block 215 having a cylindrical cavity 216 at one end and bored with three longitudinal holes 217, one at 218 of smaller diameter, as shown, communicating with the cylinder 216. The central hole 218 extends only part way through the casting and contains a coil spring 219 for urging upward the piston head 220 which fits into the cylinder 216 and to which are threaded three solid pistons 221 which fit respectively into the three other holes 217.

Into the other end of each of the solid pistons is screwed a stem 222 carrying at its lower end a valve head 223 urged toward a stop pin 224 in the stem by a dished washer spring disk 225.

By reason of the yielding mount of valves 223, seating thereof is assured even though there be small irregularities in machining. The upper end of the cylinder 216 is closed by the threaded cap 226 having an extension 227 threaded to receive the inlet pipe, and the lower ends of cylinders 217 are closed by individual outlet plugs 228. A groove 229 extends down the side of the cylinder and somewhat into the end of the cylinder, as shown, substantially as in Fig. 3, and each of the solid pistons has a longitudinal groove 230 to communicate with the valve chamber 231 therebelow.

Upon application of pressure at the pump, oil depresses the piston head 220 and with it the three solid pistons 221. As the latter move down, they expel the oil within the cylinders 217 past the now open valves 223 into chambers 231 from which the oil passes through outlet plugs 228 to the bearings.

At the end of the stroke, the piston head 220 seats upon and seals the cylinders 217, so that no more oil enters and so that no further oil escapes to the bearings, the latter receiving merely the measured quantity. When the pressure falls sufficiently to permit the spring 219 to lift the piston head, oil flows through the groove 229 at the side of the main cylinder into the cavity below the piston head.

This oil will not flow by gravity through the passage through the nipple 228 to the bearing B, since such passage is not of sufficient size to permit concurrent movement of air and oil, and lubricant is only discharged therethrough under pressure application through the piston 221. The chamber 216 at the top of the body 215 in which the piston 220 operates is never entirely filled with oil, but contains substantial quantities of air which permit ready operation of the piston 220 to discharge the measured volumes of lubricant which accumulate above the valve heads 223 when they rest against the oblique seats at the bottom of the chambers carrying the solid pistons 221.

Oil further flows through grooves 230 in the sides of the solid pistons 221 into the cavities 231 below them, so that when the piston head is at the top of its stroke, and valves 223 are seated, the space in the cylinders between the solid pistons and the seated valves is filled with oil, to be delivered to the bearing for the succeeding charge.

Another form of measuring valve appliance is shown in Fig. 5.

A cylindrical pipe fitting 232 has a plurality of integral lateral outlet nipples 233 for distribution of lubricant to the bearings and encloses a sliding piston 234 having a yielding seating end 235, urged against valve seat 236 formed integral with the fitting by a coil spring 237 reacting against the closure plug 238, which is threaded into the end of the fitting.

The piston 234 has a plurality of measuring cavities 239 in the side thereof normally maintained out of registry with the outlet nipples 233, the upper ends of said cavities being normally in communication with the circumferential groove 240 in the fitting. A pin 241 through the fitting extends into one of the cavities 239 to retain the piston against rotary displacement.

In the inlet end of the fitting, preferably adjacent the valve seat, I provide a felt plug 242 serving as a screen to prevent the entry into the fitting of any solid particles picked up in the line, this plug being preferably backed by a small mesh metal screen 243, to intercept any hairs released from the felt in operation.

In operation, as pressure is applied to the fitting, the valve 234 moves against the opposition of spring 237 away from seat 236, interrupting communication between the groove 240 and the cavities 239 and bringing said cavities into registry with the outlet nipples 233 through which the predetermined charge of oil in each cavity escapes by gravity to the corresponding bearing.

When the pressure is released, spring 237 expands, effecting return movement of the valve, during which lubricant flows past the open relief valve through the groove 240, to refill the cavities 239 until the valve is reseated, as shown in the drawing, to maintain the line in advance thereof filled with oil.

The pistons 220 and 234 of each measuring valve are displaced by the applied pressure against the resistance of springs 219 and 237 to force a definite charge of oil through the outlet nipples to the bearings B.

The discharge is limited when pistons seat against the excess of the pump charge beyond the combined volume of the measuring valves being forced through by-pass 91, Fig. 1 to the pump 9 (see Fig. 1), a drip plug and/or check valve 91a being provided in said by-pass, if desired, to relieve the lines of the excess lubricant after all of the valves have been supplied.

Upon cessation of the pressure at the pump, springs 219 and 237 expand to reseat the check valves to close each line against leakage of oil, the pistons of the measuring valves having a fit sufficiently loose or provided with leakage grooves to permit the passage of oil therebeyond to refill the measuring compartment.

It will be seen in the system set forth, that each bearing is supplied independently with a definite measured quantity of lubricant without excessive overflow, regardless in what manner the pump is charged, that is, regardless of whether the pressure transmitted through the line rises gradually to its maximum or slowly.

This operation results from the fact that the pistons of the measuring valves of Figs. 3 to 5 reliably seal the line against further egress of oil to the bearing as soon as the measured quantity has been delivered thereto. This sealing action will continue as long as pressure is being applied to the lubricating lines preventing further pressure discharge to the bearings when the predetermined charge has been delivered.

In releasing the pistons to permit their return, one or more high restriction flow metering devices designated at N in Fig. 1 may be employed in the various portions of the lubricating system connected to a bearing, or a high restriction flow metering device 91a may be utilized in the by-pass 91 back to the reservoir.

In the first case the bearings will receive the lubricant discharged by the high restriction flow metering device while in the second case this lubricant will be returned to the reservoir through the drip lug.

These high restriction flow metering devices are more fully described in application Serial No. 580,668, filed August 9, 1922, Patent No. 1,975,920 and in Patents No. 1,632,771 and No. 1,632,772.

As desired, the measuring device N may be connected in series to form a progressive measuring valve system as shown in Fig. 8 of application Serial No. 728,719, filed June 2, 1934, and outlets from the valve 215 of Fig. 1 may also be utilized to feed a system such as shown in Fig. 8 of said application Serial No. 728,719. This application is a continuation in part of application Serial No. 596,856, filed October 25, 1922 through application Serial No. 728,719, filed June 2, 1934, which applications respectively have matured into Patents 2,017,848, dated October 22, 1935, and 2,056,950, dated October 13, 1936.

Figs. 2 to 5 of the present application correspond respectively to Figs. 5, 12, 13 and 14 of Patent No. 2,017,848, application Serial No. 596,856 and to Figs. 2, 5, 6 and 8 of Patent No. 2,056,950, application Serial No. 728,719.

It will thus be seen that there is herein described a device in which the several features of this invention are embodied, and which device in its action attains the various objects of the invention and is well suited to meet the requirements of practical use.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. In a centralized lubricating installation having a central lubricant pressure source and a plurality of conduits leading outwardly from said source to bearings to be lubricated, at least one group of said bearings being provided with a measuring valve pipe fitting device, the inlet and outlet ends of which are to be connected in a tubing arrangement and receiving lubricant from said tubing arrangement and supplying a metered portion of lubricant to a bearing to be lubricated having a cylindrical casing, an inlet port connected to one of said conduits, a plurality of outlet ports, one for each bearing, and means within each casing for receiving a total charge for said group of bearings from said conduit and then proportioning it among said bearings, said means including a piston, normally positioned adjacent said inlet port and provided with a return coil spring, to cooperate with said casing to form a plurality of compartments opened to said inlet port before pressure application from said source through said inlet port and closed to said inlet port and opened to said outlet port upon pressure application and upon movement of the piston against said coil spring under said pressure application, said piston being returned by said coil spring after said pressure application.

2. In a centralized lubricating installation having a central lubricant pressure source and a plurality of conduits leading outwardly from said source to bearings to be lubricated, at least one group of said bearings being provided with a measuring valve pipe fitting device, the inlet and outlet ends of which are to be connected in a tubing arrangement and receiving lubricant from said tubing arrangement and supplying a metered portion of lubricant to a bearing to be lubricated having a cylindrical casing, an inlet port connected to one of said conduits, a plurality of outlet ports, one for each bearing, and means within each casing for receiving a total charge for said group of bearings from said conduit and then proportioning it among said bearings, said means including a piston, normally positioned adjacent said inlet port and provided with a return coil spring, to cooperate with said casing to form a plurality of compartments opened to said inlet port before pressure application from said source through said inlet port and closed to said inlet port and opened to said outlet port upon pressure application upon movement of the piston against said coil spring under said pressure application, said piston being returned by said coil spring after said pressure application, said measuring valve being provided with a piston having a plurality of chambers formed in the body thereof which are cut off from the inlet port by movement of the piston under said pressure application.

3. In a centralized lubricating installation having a central lubricant pressure source and a plurality of conduits leading outwardly from said source to bearings to be lubricated, at least one group of said bearings being provided with a measuring valve pipe fitting device, the inlet and outlet ends of which are to be connected in a tubing arrangement and receiving lubricant from said tubing arrangement and supplying a metered portion of lubricant to a bearing to be lubricated having a cylindrical casing, an inlet port connected to one of said conduits, a plurality of outlet ports, one for each bearing, and means within each casing for receiving a total charge for said group of bearings from said conduit and then proportioning it among said bearings, said means including a piston, normally positioned adjacent said inlet port and provided with a return coil spring, to cooperate with said casing to form a plurality of compartments opened to said inlet port before pressure application from said source through said inlet port and closed to said inlet port and opened to said outlet port upon pressure application and upon movement of the piston against said coil spring under said pressure application, said piston being returned by said coil spring after said pressure application, said casing being provided with a plurality of parallel chambers communicating with and opening into a large chamber, said large chamber being provided with a large piston and said small chamber being each provided with small pistons, said pistons being connected so as to move in unison, said small chambers each measuring off a pre-determined lubricant charge.

4. For use in a centralized lubricating installation for a mechanism having a plurality of spaced and distributed bearings to receive proportioned quantities of lubricant, said installation having a central reservoir, a central pump, a branched distributing piping system leading from said pump toward said bearing; a measuring valve fitting device having a single threaded inlet connection to an outlet of said piping system and also having a plurality of threaded outlet connections to bearings to be lubricated, said fitting having an elongated body with a central cylindrical bore, of a piston reciprocating in said bore, a return coil spring within said body to return said piston toward said threaded inlet connection, said fitting being interiorly provided with a plurality of measuring compartments, one for each outlet connection, to receive lubricant from said threaded inlet connection and to discharge lubricant to said threaded outlet connections, said receiving of lubricant taking place upon movement of the piston toward said threaded inlet connection and said discharging of lubricant taking place upon movement of the piston toward said threaded outlet connections.

5. The fitting device of claim 4, said compartments consisting of spaced bores in said body.

6. The fitting device of claim 4, said compartments consisting of recesses in said piston.

7. For use in a centralized lubricating installation for a mechanism having a plurality of spaced and distributed bearings to receive proportioned quantities of lubricant, said installation having a central reservoir, a central pump, a branched distributing piping system leading from said pump toward said bearing; a measuring valve fitting device having a single threaded inlet connection to an outlet of said piping system and also having a plurality of threaded outlet connections to bearings to be lubricated, and means within said fitting including a cylindrical piston, a return spring and a plurality of lubricant metering recesses filled with lubricant upon the return stroke of the piston and discharged upon the forward stroke of the piston, whereby said fitting will receive a charge of lubricant from said inlet connection and subsequently discharge it in predetermined proportions through said outlet connections.

GEORGE BIJUR,
*Executor of the Estate of Joseph Bijur, Deceased.*